United States Patent Office 2,939,869
Patented June 7, 1960

2,939,869

PYRROLIDONE PURIFICATION

Norman G. Carlson, White Bear Lake, Minn., assignor to Minnesota Mining and Manufacturing Company, St. Paul, Minn., a corporation of Delaware No Drawing. Filed Jan. 27, 1958, Ser. No. 711,178

4 Claims. (Cl. 260—326.5)

This invention relates to a process for the purification of 2-pyrrolidone.

It is known the 2-pyrrolidone, which commonly is produced by autoclaving butyrolactone with ammonia, contains various impurities which inhibit polymerization reactions. The impurities are mostly present in small but significant amounts which appear to include such substances as butyrolactone, ammonia, aliphatic amides, water and the like. Purification of this material is desirable, and fractional crystallization of pyrrolidone as the hydrate has been useful, as shown in U.S. Patent 2,802,777, while reaction with carboxylic anhydrides has also assisted in removal of certain of the impurities as shown in U.S. Patent 2,806,856.

The various purification processes known to the art provide a better grade of 2-pyrrolidone for polymerization reactions, but it is still found that polymerizations are not reproducible to yield polymer of high inherent viscosities in all instances. Because of the sensitive nature of the polymerization, it appears that the traces of impurities which are not adequately removed by any of the hitherto known processes continue to cause difficulty in producing consistently uniform polypyrrolidone. These impurities appear to consist at least in part of unsaturated substances since they decolorize bromine test solution, as will appear hereinafter.

It is an object of this invention to provide a method for the removal of certain impurities from pyrrolidone. Other objects will become evident from the following disclosure.

In accordance with the above and other objects of this invention it has been found that treatment of 2-pyrrolidone with a reductive base furnishes pyrrolidone monomer of excellent purity, which then is readily and consistently polymerizable to polypyrrolidone of relatively high molecular weight.

Broadly speaking, the reductive base treatment of the present invention consists in subjecting pyrrolidone to the action of a reductive base at a temperature in the range of from about 25° C. to about 100° C. The purified pyrrolidone is then distilled from the basic reaction products under reduced pressure.

The reductive bases which are useful in the process of the invention are exemplified by the hydrides of alkali metals, such as lithium hydride, sodium hydride and potassium hydride. Generally speaking, a sufficient amount of the selected reductive base should be employed to provide at least about 0.01 equivalent of hydride ion per mole of pyrrolidone. Preferably, about 0.5 to about 10 parts by weight of reductive base are employed for each 100 parts of pyrrolidone to be treated. The treatment is carried out for about 5 minutes to an hour although longer times of treatment are not detrimental.

It may be considered desirable to subject the pyrrolidone which is to be treated according to the process of the invention to a preliminary purification process for removal of water or other impurities. For example, the crude pyrrolidone may be distilled under vacuum, rejecting foreruns containing water, and collecting a central cut. Such treatments do not interfere with the subsequent action of the reductive base.

The following examples, in which all parts are by weight unless otherwise specified, further illustrate the invention but do not limit the scope thereof. They are provided to show the best method contemplated for carrying out the process of the invention. Inherent viscosities of the polymers described are determined by the usual procedure at a concentration of 0.2 g. of polymer per 100 ml. of metacresol.

*Example 1*

One thousand thirty seven parts of commercial pyrrolidone, previously distilled at about 45 to 65 mm. Hg rejecting about 5 to 10 percent as a forerun thereby reducing the water content, and 6.5 parts of sodium hydride are placed in a vessel fitted for distillation and mechanical agitation and heated under reduced pressure (about 7 mm. Hg) until distillation commences at about 120° C. The total heating time before distillation is about 25 minutes. The forerun of about 15 percent containing the remaining water is rejected and substantially anhydrous purified pyrrolidone is collected boiling between 120° C. and 130° C. at about 5 to 10 mm. of mercury pressure. The water-white distilled pyrrolidone crystallizes on cooling and melts sharply at about 24° C. The monomer is readily polymerized in good yield to polymer. In this connection, it has been found that alkali metal hydrides can also be used as polymerization catalysts, to form the alkali metal salts of pyrrolidone; and this heretofore unknown procedure is described and claimed in the copending U.S. patent application of Carlson et al., Serial Number 711,127. Thus, 100 parts of the purified monomer are mixed with one part of sodium hydride and 0.025 part of butyrolactone and the mixture is permitted to stand at ambient temperatures for 6 days. No discoloration ensues as a result of this treatment and in addition it is found that there has been about 25 percent conversion to polypyrrolidone having an inherent viscosity of 1.34. The polymer is isolated and washed as described for the conventional base-catalyzed polymerization of pyrrolidone described in U.S. Patents 2,638,463 and 2,809,958.

The monomer samples employed in these polymerization runs are compared for the presence of unsaturated materials as follows: A solution of about 2.0 grams bromine is prepared in 30 ml. of carbon tetrachloride, and one-half gram samples of monomers are titrated for unsaturates by dropwise addition of the bromine solution to the respective samples dissolved in about 5 ml. of carbon tetrachloride. It is found that the monomer distilled by the usual procedure requires 10 drops or more of bromine solution before a permanent yellow tint is imparted to the solution, while the monomer distilled from sodium hydride requires only 2 drops to give the same end point. This shows a very considerable decrease in content of unsaturates.

*Example 2*

Potassium pyrrolidone is prepared by addition during 3 hours of 70 parts of substantially anhydrous pyrrolidone previously purified by the process of this invention by distillation from sodium hydride according to the procedure of Example 1 to an agitated suspension of 30 parts of potassium in 250 parts of toluene under an atmosphere of nitrogen at 60° to 70° C. As the reaction takes place the blue grey suspension of potassium is slowly converted to the pure white suspension of potassium pyrrolidone. After the addition of pyrrolidone is complete, the mixture is heated at 60° to 70° C. for about 1 hour to insure complete reaction of potassium with pyrrolidone. Using a filter stick, toluene is sucked out of the reaction vessel and then the potassium pyrrolidone is reslurried in anhydrous heptane three times, withdrawing the heptane after each operation with the filter stick and at all times maintaining an atmosphere of nitrogen. The potassium pyrrolidone is then sucked as dry as possible using the filter stick and finally dried in the reaction vessel by heating at 125° C. for 12 hours under a vacuum of about 5 mm. Hg.

The polymerization of pyrrolidone is effected by dissolving 5.6 parts of anhydrous potassium pyrrolidone in 100 parts of pyrrolidone purified by the process of this invention by distillation from sodium hydride as in Example 1 and then adding 0.75 part of acetyl pyrrolidone. The polymerization proceeds at room temperature for about 24 hours and the resulting product is worked up by breaking up the solid mass and comminuting in 400 parts of distilled water. After collecting the finely divided polymer it is washed five times with about 400 parts of distilled water and dried in vacuo at 70° C. About 51 percent conversion is realized and the polypyrrolidone has an inherent viscosity of 2.5.

When this procedure is repeated using pyrrolidone which has been redistilled only, it is found that the polypyrrolidone which is obtained in about 32 percent conversion has an inherent viscosity of 1.4.

The benefits of this invention are also realized when the commercially available pyrrolidone is treated directly with a reductive base without a preliminary distillation. However, it is preferred to do one distillation rejecting a forerun which contains a large portion of the water which commonly appears in the commercially available material. Other methods for the removal of excessive amounts of water are also usefully employed before and/or after the treatment with the reductive base, and may be used in conjunction with it if so desired.

Example 3

In a vessel equipped for addition, vacuum distillation and mechanical agitation are placed 200 parts of pyrrolidone purified by rapid distillation under reduced pressure from about 2 parts of sodium hydride but not otherwise dried. There are added 2.2 parts of potassium hydroxide and the mixture is agitated and heated to dissolve the potassium hydroxide. The temperature is raised rapidly and 100 parts of pyrrolidone are removed carrying with it the water initially present plus that formed in the reaction between pyrrolidone and potassium hydroxide. The contents of the flask are cooled to about 25° C. and a solution of 0.735 part of acetylpyrrolidone in 125 parts of heptane is added with the efficient agitation. Polymerization proceeds rapidly to give a granular polymer. After stirring for about 1 hour the reaction mixture is allowed to stand overnight and is then worked up by decanting the heptane and collecting the polymer and comminuting and washing as in Example 2. The inherent viscosity and yield of polypyrrolidone are 2.2 and 50 percent, respectively. This is significantly better than 1.5 and 35 percent, respectively, obtained when the reaction is repeated with untreated pyrrolidone.

What is claimed is:

1. In the process for the purification of 2-pyrrolidone produced by the action of ammonia on butyrolactone, the step which comprises treating crude pyrrolidone with an alkali metal hydride.

2. The process step according to claim 1, wherein the alkali metal hydride is sodium hydride.

3. The process step according to claim 1, in which the crude 2-pyrrolidone is subjected to the action of the alkali metal hydride for a period of about 5 minutes to about 1 hour.

4. A process for the purification of 2-pyrrolidone which is produced by the action of ammonia on butyrolactone, which comprises subjecting crude 2-pyrrolidone to the action of an alkali metal hydride in amount of about 0.5 to about 10 parts by weight of the hydride for every 100 parts by weight of pyrrolidone, at a temperature in the range of about 25° C. to about 100° C., and distilling the pyrrolidone therefrom.

References Cited in the file of this patent
UNITED STATES PATENTS
2,828,307    Soeterbroek et al. _____ Mar. 25, 1958